US007000225B2

(12) United States Patent
Sangavarapu et al.

(10) Patent No.: US 7,000,225 B2
(45) Date of Patent: Feb. 14, 2006

(54) METHOD FOR INSERTING GLOBAL BREAKPOINTS

(75) Inventors: Vamsi Krishna Sangavarapu, Bangalore (IN); Suparna Bhattacharya, Bangalore (IN); Anand Krishnamoorthy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 09/732,342

(22) Filed: Dec. 7, 2000

(65) Prior Publication Data

US 2002/0073402 A1    Jun. 13, 2002

(51) Int. Cl.
G06F 9/44    (2006.01)
(52) U.S. Cl. .................. 717/129; 717/130; 717/131
(58) Field of Classification Search ........ 717/100–178; 714/38, 6; 703/23
See application file for complete search history.

(56) References Cited

U.S. PATENT DOCUMENTS

| 4,761,737 A | * | 8/1988 | Duvall et al. ............... 711/209 |
| 4,819,234 A | * | 4/1989 | Huber ......................... 717/129 |
| 5,611,043 A | * | 3/1997 | Even et al. .................. 714/38 |
| 5,664,159 A | * | 9/1997 | Richter et al. ............... 703/23 |
| 6,286,132 B1 | * | 9/2001 | Tanaka et al. ............... 717/125 |
| 6,615,365 B1 | * | 9/2003 | Jenevein et al. ............. 714/6 |
| 6,708,326 B1 | * | 3/2004 | Bhattacarya ................. 717/124 |
| 2005/0188358 A1 | * | 8/2005 | Johnson et al. ............ 717/129 |

OTHER PUBLICATIONS

Aral, Efficient Degugging Primitives for Multiprocessors, 1989, ACM.*
Koch et al. Breakpoints and Breakpoint Detection in Source-Level Emulation, 1998, ACM.*
Copperman and Thomas, Poor Man's Watchpoints, ACM, Jan. 1995.*
Moore, Dynamic probes and Generalised Kernel Hooks Interface for Linux, Oct. 2000.*

* cited by examiner

Primary Examiner—Kakali Chaki
Assistant Examiner—Insun Kang
(74) Attorney, Agent, or Firm—Schmeiser, Olsen & Watts; William H. Steinberg (57) ABSTRACT

A method, an apparatus, and a computer program product for inserting one or more global breakpoints for debugging computer software. A method, an apparatus, and a computer program product for removing one or more global breakpoints for debugging computer software. The inserting method includes the steps of: inserting a global breakpoint in a page containing software code if the page is present in memory; reading the page into memory if not present in memory, and inserting a global breakpoint in the page immediately after being read into memory; and detecting a private copy of the page if present, and inserting a global breakpoint in the private copy.

48 Claims, 3 Drawing Sheets

METHOD FOR INSERTING GLOBAL BREAKPOINTS

FIELD OF THE INVENTION

The present invention relates to the debugging of software and computer programs and more particularly to the use of breakpoints in debugging processes.

BACKGROUND

Debugging is a process of detecting and locating errors or events in computer programs and other software with a view to eliminating such errors or events. Debugging may also involve the step of eliminating such errors. The debugging process is implemented using a debugger, which is a computer program or programs for detecting, tracing, and eliminating errors or events in computer programs and other software. The latter are each referred to hereinafter as the "debugee".

A breakpoint is a point in a computer program or software where execution may be halted, normally at a place that is convenient for restarting execution of the program or software (i.e., the debugee) from that point. That is, breakpoints are events deliberately inserted or "planted" in a debugee by a debugger to receive control when the debugee reaches the certain point during execution of the debugee. At that point, the debugger needs access to the state of the debugee (perhaps with the ability to change that state), and either to resume or terminate execution of the debugee.

If a breakpoint is applicable only in the context of a specific process, the breakpoint is considered to be a local breakpoint. The same applies for plural breakpoints. Application debuggers generally use local breakpoints.

In contrast, global breakpoints are breakpoints active across all processes executing in a computer system, where two or more processes may use the same code segment. In other words, global breakpoints are applicable in all instances of a program or software code segment. If a global breakpoint event occurs, the debugger can instrument the debugged code irrespective of the process running that code. In this case, the concept of one debugee does not apply, and the target is not the process being debugged but the code that is being executed. Kernel-level debuggers and some code-instrumentation tools use global breakpoints, because the focus is on the code being debugged/instrumented and not on any specific process context.

One conventional technique used in the Dynamic Trace tool on OS/2 operating system provides for global breakpoints. However, it is inconsistent in the sense that breakpoints are not active in the context of processes that make private copies of the code pages with breakpoints in those code pages.

Thus, a need clearly exists for an improved method of inserting and/or removing global breakpoints in software.

SUMMARY

In accordance with a first aspect of the invention, a method of inserting one or more global breakpoints for debugging computer software is disclosed. The method includes the steps of: inserting a global breakpoint in a page containing software code if the page is present in memory; reading the page into memory if not present in memory, and inserting a global breakpoint in the page immediately after being read into memory; and detecting a private copy of the page if present, and inserting a global breakpoint in the private copy.

Preferably, the reading step includes the step of providing a readpage process for reading the page into memory and being adapted to insert a global breakpoint in the page immediately after being read into memory, the readpage process may be implemented as a kernel routine that is called when the page is loaded into memory. The adaptation of the readpage process may preferably be achieved by changing a file specific readpage process to a wrapper routine that invokes an original readpage process and then performs the operation required.

More preferably, the reading step includes the step of setting up an operation to insert the global breakpoint in the page immediately after the page is read into memory by an operating system, if the page is not already in memory.

Preferably, the detecting step includes the step of swapping the copy to a swap device after inserting the global breakpoint in the copy. More preferably, the detecting step includes the further step of marking the copy as dirty after inserting the global breakpoint in the copy, whereby when swapping the copy to a swap device, the global breakpoint is present in the swapped copy.

Preferably, the method further includes the step of identifying the global breakpoint using an identifier of a file and an offset in the file. The file identifier may be an inode. Still further, the method may further include the step of determining if the page is present in memory using a lookup table based on the file identifier and the offset.

In accordance with a second aspect of the invention, a computer-implemented apparatus for inserting one or more global breakpoints for debugging computer software is disclosed. The apparatus includes:

a central processing unit for executing the computer software;
  memory for storing at least a portion of the computer software;
  a module for inserting a global breakpoint in a page containing software code if the page is present in memory;
  a module for reading the page into memory if not present in the memory, and inserting a global breakpoint in the page immediately after being read into memory; and
  means for detecting a private copy of the page if present, and inserting a global breakpoint in the private copy.

In accordance with a third aspect of the invention, a computer program product having a computer readable medium having a computer program recorded therein for inserting one or more global breakpoints for debugging computer software is disclosed. The computer program product includes:

a computer program code module for inserting a global breakpoint in a page containing software code if the page is present in memory;
  a computer program code module for reading the page into memory if not present in the memory, and inserting a global breakpoint in the page immediately after being read into memory; and
  a computer program code module for detecting a private copy of the page if present, and inserting a global breakpoint in the private copy.

In accordance with a fourth aspect of the invention, a method of removing one or more global breakpoints for debugging computer software is disclosed. The method includes the steps of:

removing a global breakpoint in a page containing software code if the page containing the global breakpoint is present in memory; and detecting a private copy of the page if present, reading the page into memory if not present in the memory, and removing a global breakpoint in the private copy.

Preferably, the reading step includes the step of turning off an operation set up earlier for inserting a global breakpoint in the page when the page is read into memory.

In accordance with a fifth aspect of the invention, a computer-implemented apparatus for removing one or more global breakpoints for debugging computer software is disclosed. The apparatus includes:
- a central processing unit for executing the computer software;
- memory for storing at least a portion of the computer software;
- a module for removing a global breakpoint in a page containing software code if the page is present in memory; and
- a module for detecting a private copy of the page if present, reading the page into memory if not present in the memory, and removing a global breakpoint in the private copy.

In accordance with a sixth aspect of the invention, a computer program product having a computer readable medium having a computer program recorded therein for removing one or more global breakpoints for debugging computer software is disclosed. The computer program product includes:
- a computer program code module for removing a global breakpoint in a page containing software code if the page is present in memory; and
- a computer program code module for detecting a private copy of the page if present, reading the page into memory if not present in the memory, and removing a global breakpoint in the private copy.

BRIEF DESCRIPTION OF THE DRAWINGS

A small number of embodiments are described in which.

DETAILED DESCRIPTION

A method, an apparatus, and a computer program product are disclosed for inserting one or more global breakpoints for debugging computer software. Further, a method, an apparatus, and a computer program product for removing the global breakpoints are also disclosed. In the following description, numerous details are set forth including particular operating systems. It will be apparent to one skilled in the art, however, that the present invention may be practised without these specific details. In other instances, well-known features are not described in detail so as not to obscure the present invention.

In the following description, components of global breakpoint insertion and removal systems are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Overview

The methods according to the embodiments of the invention deals with global breakpoints. More particularly, a method of inserting, as well as removing, global breakpoints by patching code segments is disclosed. In accordance with the embodiments of the invention, the method inserts and removes global breakpoints in a manner that is:
1. just in time, i.e. has minimal impact on system performance (and resources),
2. minimally intrusive, and
3. consistent, i.e. works even for processes that have a private copy of code pages (truly global).

The preferred embodiment makes use of certain aspects of UNIX®-like operating systems to implement global breakpoints in a less intrusive fashion. In the following description, a page refers to a unit of main memory. Many modern processor architectures provide facilities to, and many modern operating systems do, deal with the main memory in fixed size units called pages.

The method for inserting global breakpoints includes the following steps:
1. To handle breakpoints in pages that are to be loaded into memory in the future, registering a routine to be called when pages for that code module are loaded into physical memory (inode→readpage function in LINUX® for example). This routine inserts all the breakpoints for that page by placing breakpoint instructions at specified locations. The debugger must be able to determine which breakpoints are located on a particular page in memory. This information is generally available, though the exact way by which the information is obtained depends on the method used to specify global breakpoints.
2. Locating pages of the code module that are already present in memory, and inserting the breakpoints in the pages.
3. Detecting any private copies of pages that may have been created in different process contexts that use this module and inserting the breakpoints in those pages.

Once inserted, the breakpoints remain there since private pages of executable files are not discarded but swapped to a swap device.

A similar process or method applies for removing global breakpoints from pages of code containing such global breakpoints, as described in greater detail hereinafter.

LINUX® Specific Implementation Details (Insertion)

The following assumes that global breakpoints on an executable image are defined by the file inode and the offset in the file. Nevertheless, the following is applicable even if the global breakpoints are specified differently. For example, global breakpoints can be specified alternatively, by the executable file name, line number or even the virtual address in the context of a given process. However, before the actual process of insertion is performed as described herein, these alternative representations can be converted to the file inode and the offset in the file using well known services provided by an operating system's kernel.

Figure 1:
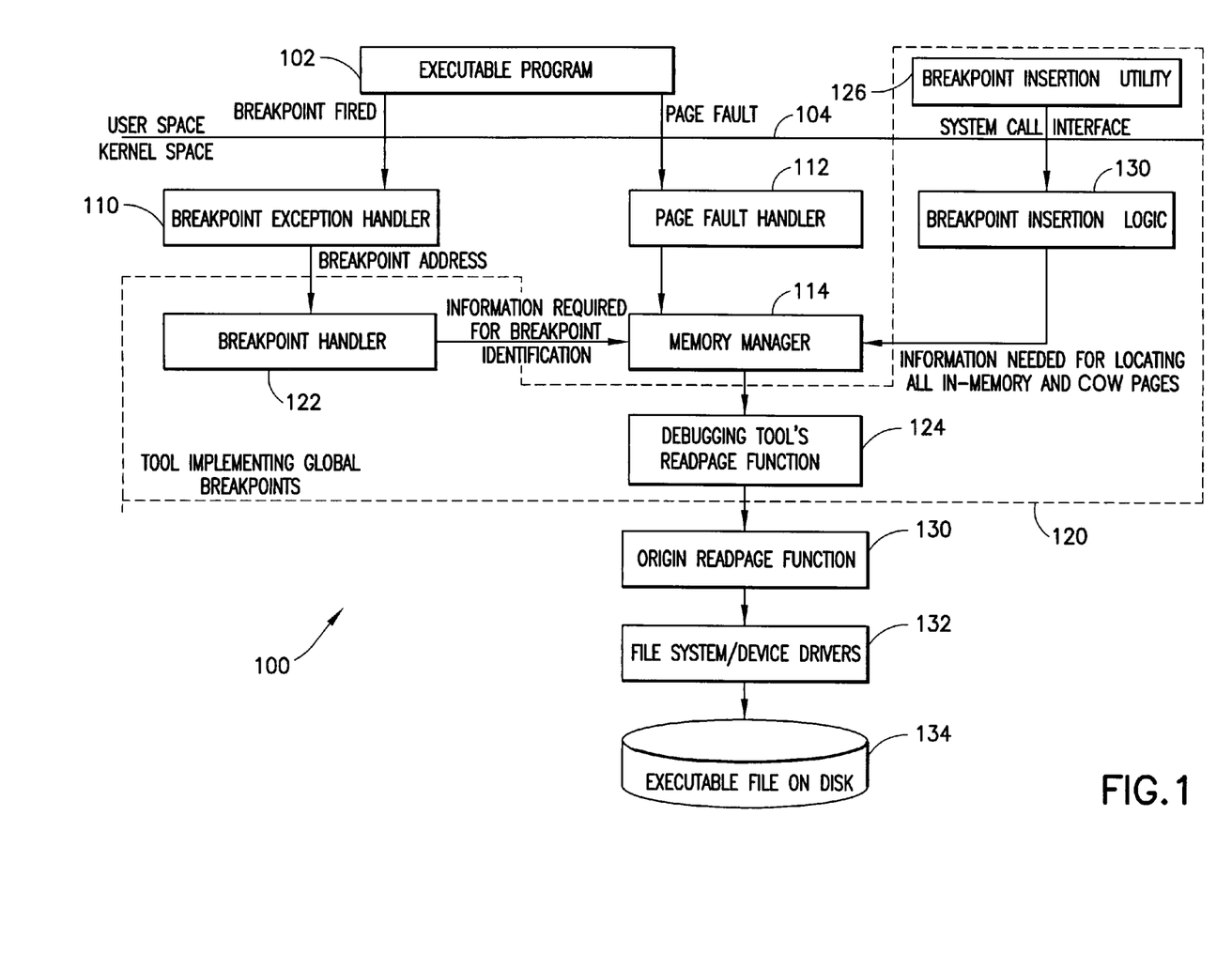
FIG. 1 is a block diagram illustrating an operating system environment including a tool implementing global breakpoints to debug software in accordance with the embodiments of the invention.

FIG. 1 illustrates an environment 100 using a tool 120 implementing global breakpoints, including the modules of the system and their interactions. The user and kernel spaces are demarcated by a line 104.

An executable program 102 executes in the user space. Every exception in the system is handled by an exception handler 110 of the kernel space, corresponding to the appropriate exception number. When an executable program 102 executes in the user space and generates a breakpoint exception (i.e., the breakpoint fires as indicated by an arrow between modules 102 and 110), the breakpoint exception handler 110 in the kernel space handles the exception. Similarly, if the executable program 102 generates a page fault exception, the page fault handler 112 of the kernel space handles this exception. The page fault handler 112 operates in conjunction with the memory manager 114 of the kernel space to bring in pages from secondary storage (also known as the swap device) to service the page fault.

The tool 120 implementing global breakpoints includes a breakpoint handler 122, a read page function module 124, a breakpoint insertion utility module 126, and a breakpoint insertion logic module 130. Except for the breakpoint insertion utility module 126, which is in the user space, the other modules of the tool 120 are in the kernel space.

The breakpoint insertion utility module 126, as noted previously, is in the user space and uses a system call interface to the breakpoint insertion logic 130 in the kernel space. The breakpoint insertion logic 130 obtains information for locating in-memory and copy-on-write (COW) pages from the memory manager 114 in the kernel space. Similarly, the breakpoint handler 122 also obtains information required for breakpoint identification from the memory manager 114.

The executable code segment in memory maps, and is backed by, the executable program image on the hard disk 134. The executable program image file 102 loaded into memory is represented by an operating system data structure, known as the inode in the LINUX® operating system. This mode structure defines the functions that can be used to perform various file-related operations on the mode. One of the operations defined by the mode structure is the readpage function. This function is used to read the contents of the file from hard disk 134 into memory. The debugging tool 120 replaces the original readpage function 130 of the inode with its own function 124. Whenever the page fault handler 112 determines that a page of the executable file needs to read into memory, operating in conjunction with the memory manager 114, the page fault handler 112 calls the readpage function of the inode, which is now 124. This readpage function 124 first calls the original readpage function 130 to actually read the page into memory with the assistance of relevant file systems and disk device drivers denoted by the block 132.

The first step in the process of inserting one or more global breakpoints is to identify the program code segment page in memory on which the global breakpoint is to be inserted. There are three possible conditions with respect to pages on which the global breakpoint has to be inserted:

1. Page is present in memory,
2. Page has been discarded, and
3. Page is private-per-process.

These are described in greater detail hereinafter.

Page is Present in Memory

If the page on which a breakpoint is to be inserted is already in memory, the page structure maintained by the operating system and corresponding to the particular page is identified. The page structure contains the offset into the code module, corresponding to the page the offset refers to, starts from. The difference between the offset defined by the user in the breakpoint specification, or obtained therefrom, and the offset referred to by the page structure gives the offset of the breakpoint location into the page. Hence, the virtual address where the breakpoint instruction should be written is calculated as follows:

(page_addr+breakpoint->offset-page->offset).

The page_addr refers to the starting virtual address corresponding to the page in memory. The breakpoint->offset refers to the offset with the executable image file where the breakpoint is desired. This is obtained from one of the breakpoint specifications, as mentioned hereinbefore. The page->offset refers to the starting offset within the executable file image that this page maps to.

Page is Not Present in Memory

A breakpoint can be applied to a page that is not present in memory. Such a condition exists because the page, which is read-only, has been discarded to create space for other processes. This may also occur when the code module is yet to be loaded into memory. Still further, this may occur when a read-only page that has already been written to and become dirty is swapped to the swap device, which is explained hereinafter. In these three cases, breakpoints must be inserted next time just after the page is loaded into memory before the breakpoint is used.

Such processing may be effectively implemented by expanding the scope of the function that reads in pages from the executable file image or the swap device into the memory. The readpage function pointer, contained in the inode along with other file-related functions that can be performed on the inode, can be replaced with a different routine that:

1. Calls the original readpage routine to actually bring the page into memory, and
2. Identifies and inserts all breakpoints in the page just brought into memory.

A side effect of this technique makes the readpage function effectively synchronous: the page has to be completely read into memory after step (1) before commencing step (2). However, this side effect is acceptable since the change of behaviour occurs only when bringing in code pages that have active breakpoints in those pages and is necessary to insert breakpoints in code pages.

Page is Private-Per-Process

A code page may possibly be 'dirtied' due to a breakpoint already inserted into the code page earlier. While what happens in such cases is operating system specific, many modern operating systems (OS), including LINUX®, handle writing to the code segment by making private-per-process code pages. This is known as the Copy-On-Write (COW) mechanism, the consequence of which is that the page is marked as dirty. Once written to, the code pages do not correspond to the executable image file on the hard disk any longer. If these code pages ever need to be temporarily removed from the main memory due to the memory pressures, these pages are saved on the hard disk (also called the swap device). This process of temporarily removing parts of main memory and saving the parts to hard disk for later retrieval, to make more space available in the main memory, is called swapping. There is no need to intercept the readpage function for this page, since the changes made are written back, saved, in the swap device, All pages already COWed for a given offset (range), at the time of inserting the breakpoints, are tracked by using the relevant fields in the inode structure by the operating system. Using this information, all the private-per-process copies of code pages can be accessed and the breakpoints can be inserted in the copies. However, if any of these code pages are not currently in main memory and are temporarily stored on the swap device, the code pages need to be brought into the main memory for inserting breakpoints in those pages.

The mechanism of identifying all the copies of a code page existing in the system is necessary to be able to apply breakpoints on those copies and make the breakpoints truly global. However, this information is readily available in the operating system.

The process 200 of the preferred embodiment is described in greater detail with reference to FIG. 2. Processing commences in step 210 with a list of global breakpoints to be inserted in an executable image file. The inode corresponding to the executable image file and the offsets within the file corresponding to all the global breakpoints are assumed to be available to the process as mentioned before.

In block 212, in the list of possible file-related operations that can be performed on the inode, the readpage function pointer in the inode structure is modified to point to the readpage function of the debugging tool (i.e., inode->i_op.readpage).

The loop subprocess 220 is carried out for each of the global breakpoints specified. In block 222, using the facilities provided by the operating system (find_page function in LINUX® kernel), the memory page corresponding to a given mode and offset is looked up. The page determined by the lookup function 222 is provided to decision block 224.

In decision block 224, a check is made to determine where the page is. If decision block 224 determines that the page is not in memory, processing for this breakpoint terminates in step 230. Otherwise, if decision block 224 determines that the page is in memory, processing continues at the insert breakpoint step 226. In step 226, the special breakpoint instruction INT3 is inserted at (page_addr+breakpoint->offset-page->offset). As described hereinbefore, this calculation gives the offset within the memory page where the breakpoint needs to be inserted. As described hereinafter, this step can be modified to remove breakpoints. Processing in subprocess 220 then terminates in step 230. This entire process consisting of steps 222, 224, 226 and 230 is repeated for each of the global breakpoints specified.

After completing the loop subprocess 220, processing continues at decision block 232. In decision block 232, a check is made to determine if there are any private-per-process pages created from this inode by looking at the i_mmap field in the inode structure. If decision block 232 returns false (no), processing terminates in step 250. Otherwise, if decision block 232 returns true (yes), processing continues at a loop subprocess 240 for all breakpoints specified on this inode. In particular, from step 232, processing continues at decision block 242 of the loop 240.

In decision block 242, a check is made to determine if the breakpoint falls in any of the private copies. If decision block 242 returns false (no), processing terminates in step 250. Otherwise, if decision step 242 returns true (yes), processing continues at decision block 244.

In decision block 244, a check is made to determine if the private copy of the page is in memory. If decision block 244 returns true (yes), processing continues at step 248. In step 248, the breakpoint instruction INT3 is inserted at (page_addr+breakpoint->offset page->offset). As described hereinbefore, this calculation gives the offset within the memory page where the breakpoint needs to be inserted. As described hereinafter, this step can be modified to implement removal of global breakpoints. Processing then terminates in step 250. Otherwise, if decision block 244 returns false (no), processing continues at step 246. In step 246, the page is brought back into the main memory. Processing then continues at step 248, as described hereinbefore.

This entire process consisting of steps 242, 244, 246, 248 and 250 is repeated for each of the global breakpoints specified.

LINUX® Specific Implementation Details (Removal)

Figure 2:
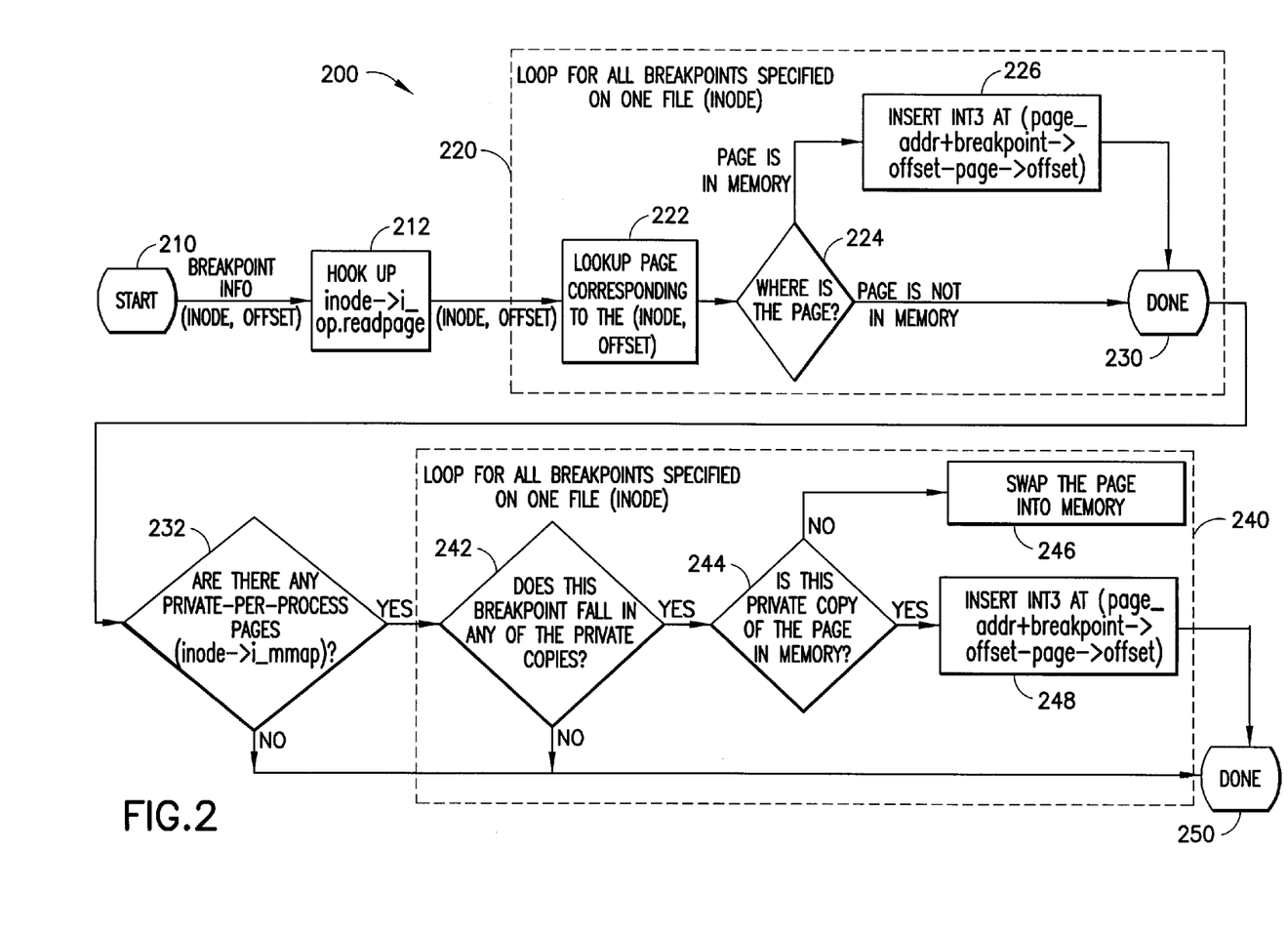
FIG. 2 is a flow diagram illustrating in detail a process of inserting global breakpoints in accordance with the preferred embodiment, the process of removing the global breakpoints being substantially the same with minor modifications.

The process to remove global breakpoints (not shown) follows the steps detailed for inserting the breakpoints shown in FIG. 2. The exception in this case again is pages that have been COWed and need identification, so that all the breakpoints in all the copies of the page are removed. Again, the same technique outlined above to track all COW pages can be used.

FIG. 2 applies to the process for removing breakpoints too. The only change is that for removal, instead of inserting the breakpoint instruction INT3 in steps 226 and 248 of FIG. 2, the breakpoint instruction INT3 instruction is replaced with the original instruction that was overwritten to insert the breakpoint in the first place.

The method of identifying, inserting, and removing global breakpoints as detailed above has the following advantages:

1. Minimally intrusive: the only hook required is in the routine that loads a page of code from the executable image. The presence of inode_operations in many UNIX®-like Operating Systems allows this to be done optimally, ensuring that there is no additional overhead when loading pages from executables with no breakpoints inserted.
2. On platforms like LINUX® where many page faults can occur, mainly to create per-process page table mappings to pages already present in memory, this approach is advantageous because spurious page faults do not arise. This method allows the debugger to intervene and insert breakpoints at the only place where they are actually necessary, i.e. when the pages are read into memory.
3. The problem of reinserting breakpoints when discarded code pages are brought back into memory is seamlessly handled. The fact that the same inode_operation is carried out when reloading discarded code pages makes this possible.
4. All the code pages with breakpoints are not required to be present in memory when inserting breakpoints, nor is this caused to happen, ensuring that programatically inserting a large number of breakpoints in one module does not cause any significant overhead.
5. Generally process-level (application) debuggers operate by inserting breakpoints on private-per-process code pages. The approach outlined above ensures that the global breakpoint facility can function correctly and consistently even in the presence of other debuggers.

Thus, the embodiments of the invention enable the handling elegantly, consistently and seamlessly of the problem of inserting and removing global breakpoints with minimum overhead.

The embodiments of the invention are preferably implemented using a general-purpose computer. In particular, the processing or functionality of FIGS. 1 and 2 can be implemented as software, or a computer program, executing on the computer. The method or process steps for inserting one or more global breakpoints for debugging computer software are effected by instructions in the software that are carried out by the computer. The same applies for removing the global breakpoints. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on the medium that can be carried out by a computer. The use of the computer program product in the computer preferably effects advantageous apparatuses for inserting and/or removing one or more global breakpoints for debugging computer software.

Figure 3:
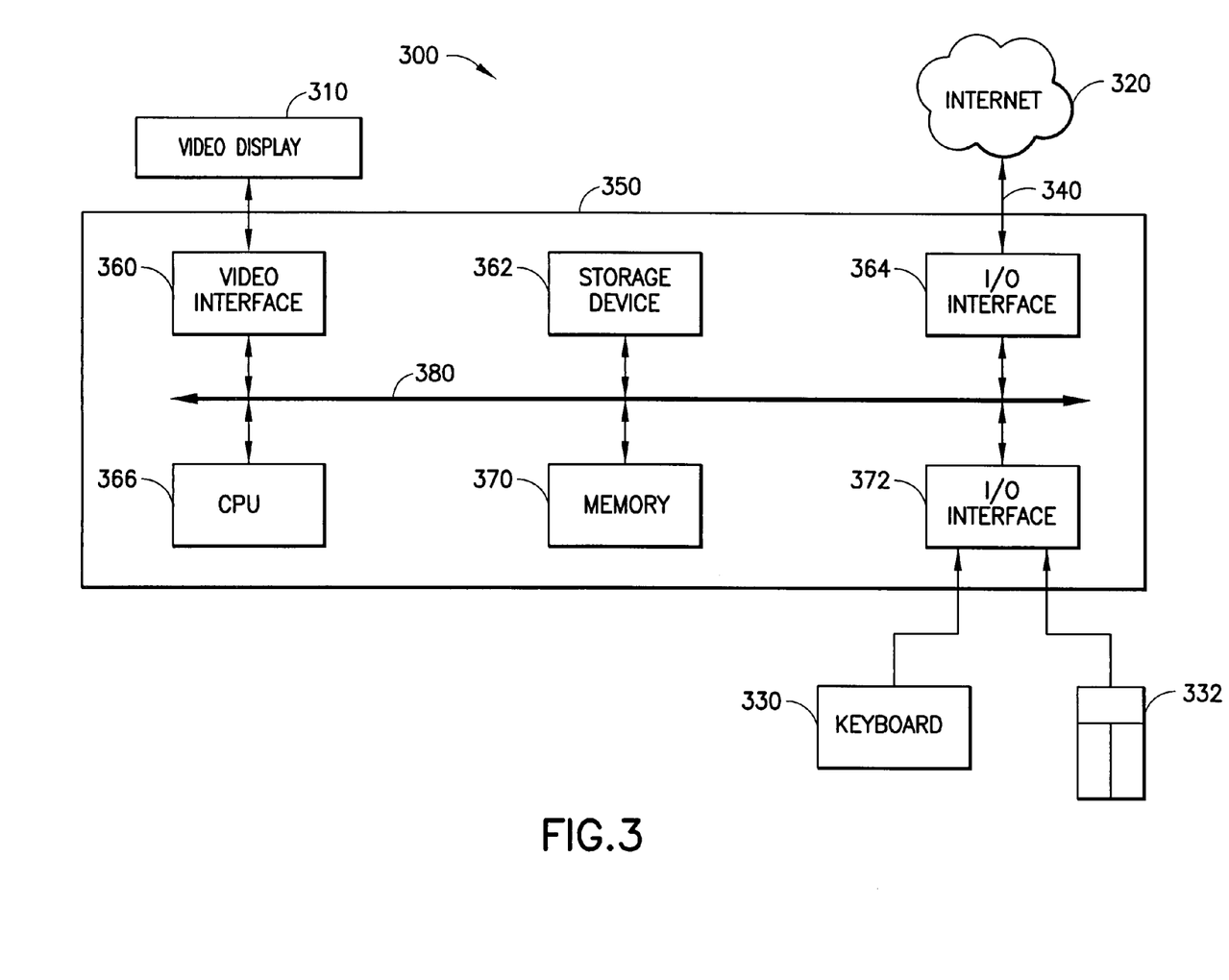
FIG. 3 is a block diagram of a general purpose computer, with which the embodiments of the invention can be practiced.

Preferably, a computer system 300 shown in FIG. 3 includes the computer 350, a video display 310, and input devices 330, 332. In addition, the computer system 300 can have any of a number of other output devices including line printers, laser printers, plotters, and other reproduction devices connected to the computer 350. The computer system 300 can be connected to one or more other computers via a communication interface using an appropriate communication channel 340 such as a modem communications path, a computer network, or the like. The computer network 320 may include a local area network (LAN), a wide area network (WAN), an Intranet, and/or the Internet.

The computer 300 preferably includes a central processing unit(s) 366 (simply referred to as a processor hereinafter), a memory 370 which may include random access memory (RAM) and read-only memory (ROM), input/output (IO) interfaces 364, 372, a video interface 360, and one or more storage devices 362. The storage device(s) 362 can include one or more of the following: a floppy disc, a hard disc drive, a magneto-optical disc drive, CD-ROM, magnetic tape or any other of a number of non-volatile storage devices well known to those skilled in the art. Each of the components is typically connected to one or more of the other devices via a bus 380 that in turn can consist of data, address, and control buses.

The video interface 360 is connected to the video display 310 and provides video signals from the computer for display on the video display 310. User input to operate the computer can be provided by one or more input devices 330, 332. For example, an operator can use a keyboard 330 and/or a pointing device such as the mouse 332 to provide input to the computer.

The foregoing system is simply provided for illustrative purposes and other configurations can be employed without departing from the scope and spirit of the invention. Computers with which the embodiment can be practiced include IBM-PC/ATs or compatibles, one of the Macintosh (TM) family of PCs, Sun Sparcstation (TM), a workstation or the like. The foregoing are merely examples of the types of computers with which the embodiments of the invention may be practiced. Typically, the processes of the embodiments, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet 320 and Intranets including email transmissions and information recorded on websites and the like. The foregoing are merely examples of relevant computer readable mediums. Other computer readable mediums may be practiced without departing from the scope and spirit of the invention.

Finally, while the preferred embodiment is implemented using the LINUX® operating system, it will be appreciated by those skilled in the art in view of this disclosure that the invention can be practiced with other UNIX®-like operating systems, such as Sun, HP, and AIX.

The methods according to the preferred embodiment utilise characteristics of the LINUX® operating system. However, the embodiments have application to different operating system, requiring some modification, The advantages in terms of efficiency and non-intrusiveness may not be achievable to the extent possible in the LINUX® OS, in case the other OS does not support similar characteristics. The following is a list of significant aspects that are depended on at a conceptual level:

1. The OS provides a mechanism through which the logic that loads code/data into memory from a particular file can be hooked into, In UNIX®-like systems (e.g. SUN), where there is an evolved virtual file system interface enabling specialised file system implementations including filter file systems where the low-level file system interface routines can be overridden or intercepted at the granularity of an individual file, this should be possible.

On an operating system like Windows NT, where file system routines may not be directly interceptable at individual file level but rather at a drive level, the performance is not as good, since there is an extra check happening for all files on that file system.

Also, since the main requirement is to be able to intercept the actual loading of code pages from executable files, which are typically mapped into memory, this kind of interception has to support memory-mapped input/output (IO) situations where this loading may be triggered via a page fault. That is likely to be the case wherever support for layered file systems is intentionally built in 2. The OS maintains sufficient information to be able to track down the physical pages that have been loaded directly from a particular executable file (i.e. physical pages backed by that file). This is likely to be the case on many operating systems, where executable code pages are common (read-shared) across all processes running that executable. For any new process that is to run the same executable, the OS needs this information to cause the necessary mappings to the existing loaded pages to occur.

3. The OS maintains sufficient information, even if via indirect means, to locate all the private-copy pages that have been generated via the copy-on-write mechanism from a given executable page. The indirect means suggested in the preferred embodiment depends on the OS maintaining a list of all the address spaces in which portions of a particular file are mapped and a way to correlate the file offsets to the corresponding virtual addresses of the mappings. The former may not be supported in some operating systems, like Windows NT. The absence of such support or a way to get to the page table mappings in all process contexts where a given physical page (backed by a file) is mapped, makes difficult providing for invalidation of a particular physical page if needed. This has some ramifications in terms of limitations of the OS, e.g. in supporting cache coherency for memory mapped files in distributed file system client implementations.

On an OS that does not provide the required support, the embodiments of the invention functionality are limited to the extent of not being able to insert global breakpoints on existing private-copy pages for that executable. For example, if the executable is already being debugged by an application debugger that has placed a breakpoint of its own, that particular private-copy page might get missed.

The remaining assumptions relate to page table based memory management approach, and the OS maintaining virtual address range descriptors for each address space, which is common to several operating systems. Any OS that addresses these aspects can be used for implementing the embodiments of the invention.

In the foregoing manner, a method, an apparatus, and a computer program product for inserting one or more global breakpoints for debugging computer software have been disclosed. Further, a method, an apparatus, and a computer program product for removing the global breakpoints have also been disclosed. While only a small number of embodiments are described, it will be apparent to those skilled in the art in view of this disclosure that numerous changes and/or modifications can be made without departing from the scope and spirit of the invention.

We claim:

1. A method of inserting a plurality of global breakpoints into computer software for debugging the computer software, said method performed by executing a computer program on a processor of a computer system, said executing including performing the steps of:
   performing by the computer program a first loop over the global breakpoints such that for each global breakpoint in the first loop; determining a page into which the global breakpoint is to be inserted, reading the page from an executable image into physical memory if the page is not present in the physical memory, and inserting the global breakpoint in the page present in the physical memory; and
   performing by the computer program a second loop over the global breakpoints such that for each global breakpoint in the second loop; determining if a private copy exists for the page into which the global breakpoint is to be inserted, detecting the private copy if the private copy exists, reading the private copy from an executable into physical memory if the private copy exists and is not present in the physical memory, and inserting the global breakpoint in the private copy present in the physical memory,
   wherein said reading the page into the physical memory further comprises changing a file specific readpage process to a wrapper routine that invokes an original readpage process and then performs said inserting the global breakpoints.

2. The method according to claim 1, wherein said readpage process is implemented as a kernel routine that is called when said page is loaded into the physical memory.

3. The method according to claim 1, wherein said reading step includes the step of setting up an operation to insert said global breakpoint in said page immediately after said page is read into the physical memory by an operating system, if said page is not already in the physical memory.

4. The method according to claim 1, wherein said detecting step includes the step of swapping said copy to a swap device after inserting said global breakpoint in said copy.

5. The method according to claim 4, wherein said detecting step includes the further step of marking said copy as dirty after inserting said global breakpoint in said copy, whereby when swapping said copy to said swap device, said global breakpoint being present in said swapped copy.

6. The method according to claim 1, said executing further including the step of identifying each global breakpoint using an identifier of a file and an offset in said file.

7. The method according to claim 6, wherein said file identifier is an inode.

8. The method according to claim 6, further including during execution of said first loop the step of determining if said page is present in the physical memory using a lookup table based on said file identifier and said offset associated with said global breakpoint.

9. A computer-implemented apparatus for inserting a plurality of global breakpoints into computer software for debugging the computer software, said apparatus including:
   a central processing unit for executing said computer software;
   memory for storing at least a portion of said computer software;
   first means for performing by a computer program a first loop over the global breakpoints such that for each global breakpoint in the first loop said first means includes: means for determining a page into which the global breakpoint is to be inserted, means for reading the page from an executable into physical memory if the page is not present in the physical memory, and means for inserting the global breakpoint in the page present in the physical memory; and
   second means for performing by the computer program a second loop over the global breakpoints such that for each global breakpoint in the second loop said second means includes: means for determining if a private copy exists for the page into which the global breakpoint is to be inserted, means for detecting the private copy if the private copy exists, means for reading the private copy from an executable into the physical memory if the private copy exists and is not present in the physical memory, and means for inserting the global breakpoint in the private copy present in the physical memory; wherein said reading the page into the physical memory further comprises changing a file specific readpage process to a wrapper routine that invokes an original readpage process and then performs said inserting the global breakpoint—has been added.

10. The apparatus according to claim 9, wherein said readpage process is implemented as a kernel routine that is called when said page is loaded into said physical memory.

11. The apparatus according to claim 9, wherein said reading means includes means for setting up an operation to insert said global breakpoint in said page immediately after said page is read into the physical memory by an operating system, if said page is not already in the physical memory.

12. The apparatus according to claim 9, wherein said detecting means includes means for swapping said copy to a swap device after inserting said global breakpoint in said copy.

13. The apparatus according to claim 12, wherein said detecting means includes means for marking said copy as dirty after inserting said global breakpoint in said copy, whereby when swapping said copy to a swap device, said global breakpoint being present in said swapped copy.

14. The apparatus according to claim 9, further including means for identifying each global breakpoint using an identifier of a file and an offset in said file.

15. The apparatus according to claim 14, wherein said file identifier is an inode.

16. The apparatus according to claim 14, further including means for determining during execution of said first loop if said page is present in said physical memory using a lookup table based on said file identifier and said offset associated with said global breakpoint.

17. A computer program product having a computer readable medium having a computer program recorded therein for inserting a plurality of global breakpoints into computer software for debugging the computer software, said computer program product including:

first computer program code means for performing by the computer program a first loop over the global breakpoints such that for each global breakpoint in the first loop said first means includes: computer program code means for determining a page into which the global breakpoint is to be inserted, computer program code means for reading the page from an executable into physical memory if the page is not present in the physical memory, and computer program code means for inserting the global breakpoint in the page present in the physical memory; and second computer program code means for performing by the computer program a second loop over the global breakpoint such that for each global breakpoint in the second loop said second means includes: computer program code means for determining if a private copy exists for the page into which the global breakpoint is to be inserted, computer program code means for detecting the private copy if the private copy exists, computer program code means for reading the private copy from an executable image into the physical memory if the private copy exists and is not present in the physical memory, and computer program code means for inserting the global breakpoint in the private copy present in the physical memory;

wherein said reading the page into the physical memory further comprises changing a file specific readpage process to a wrapper routine that invokes an original readpage process and then performs said inserting the global breakpoints—has been added.

18. The computer program product according to claim 17, wherein said readpage process is implemented as a kernel routine that is called when said page is loaded into said physical memory.

19. The computer program product according to claim 17, wherein said computer program code means for reading includes computer program code means for setting up an operation to insert said global breakpoint in said page immediately after said page is read into the physical memory by an operating system, if said page is not already in the physical memory.

20. The computer program product according to claim 17, wherein said computer program code means for detecting includes computer program code means for swapping said copy to a swap device after inserting said global breakpoint in said copy.

21. The computer program product according to claim 20, wherein said computer program coda means for detecting includes computer program code means for marking said copy as dirty after inserting said global breakpoint in said copy, whereby when swapping said copy to a swap device, said global breakpoint being present in said swapped copy.

22. The computer program product according to claim 17, further including computer program code means for identifying each global breakpoint using an identifier of a file and an offset in said file.

23. The computer program product according to claim 22, wherein said file identifier is an inode.

24. The computer program product according to claim 22, further including computer program code means for determining during execution of said first loop if said page is present in said physical memory using a lookup table based on said file identifier and said offset associated with said global breakpoint.

25. The method according to claim 1, further comprising the step of:

removing the plurality of global breakpoints from the computer software, said method performed by executing the computer program on the processor of the computer system, said executing including performing the steps of:

performing by the computer program a first loop over the global breakpoints such that for each global breakpoint in the first loop; determining a page from which the global breakpoint is to be removed, reading the page from an executable image into the physical memory if the page is not present in the physical memory, and removing the global breakpoint from the page present in the physical memory; and performing by the computer program a second loop over the global breakpoints such that for each global breakpoint in the second loop; determining if a private copy exists for the page from which the global breakpoint is to be removed, detecting the private copy if the private copy exists, reading the private copy into the physical memory if the private copy exists and is not present in the physical memory, and removing the global breakpoint from the private copy present in memory.

26. The method according to claim 25, wherein said reading step includes the step of providing a readpage process for reading said page into the physical memory and for removing the global breakpoint in said page immediately after being read into the physical memory:

wherein said reading step includes the step of turning off an operation set up earlier for inserting the global breakpoint in said page when said page is read into the physical memory.

27. The method according to claim 26, wherein said readpage process is implemented as a kernel routine that is called when said page is loaded into the physical memory.

28. The method according to claim 25, further including the step of identifying said global breakpoint using an identifier of a file and an offset in said file.

29. The method according to claim 28, wherein said file identifier is an inode.

30. The method according to claim 28, further including the step of determining if said page is present in the physical memory using a lookup table based on said file identifier and said offset.

31. The computer-implemented apparatus according to claim 11, further including means for removing the plurality of global breakpoints from the computer software, said apparatus including:
  the central processing unit for executing said computer software;
  the memory for storing at least a portion of said computer software;
  first means for performing by a computer program a first loop over the global breakpoints such that for each global breakpoint in the first loop; means for determining a page from which the global breakpoint is to be removed, means for reading the page from an executable image into the physical memory if the page is not present in the physical memory, and means for removing the global breakpoint from the page present in the physical memory; and
  second means for performing by the computer program a second loop over the global breakpoints such that for each global breakpoint in the second loop; means for determining if a private copy exists for the page from which the global breakpoint is to be removed, means for detecting the private copy if the private copy exists, means for reading the private copy into the physical memory if the private copy exists and is not present in the physical memory, and means for removing the global breakpoint from the private copy present in the physical memory;
  wherein said reading means includes means for turning off an operation set up earlier for inserting the global breakpoint in said page when said page is read into the physical memory.

32. The apparatus according to claim 31, wherein said reading means includes means for providing a readpage process for reading said page into said physical memory and for removing said global break point in said page immediately after being read into the physical memory.

33. The apparatus according to claim 32, wherein said readpage process is implemented as a kernel routine that is called when said page is loaded into said physical memory.

34. The apparatus according to claim 31, further including means for identifying said global breakpoint using an identifier of a file and an offset in said file.

35. The apparatus according to claim 34, wherein said file identifier is an inode.

36. The apparatus according to claim 34, further including means for determining if said page is present in said physical memory using a lookup table based on said file identifier and said offset.

37. The computer program product according to claim 21, further including computer program code means for removing the plurality of global breakpoints from the computer software, said computer program product including:
  first computer program code means for performing by the computer program a first loop over the global breakpoint such that for each global breakpoint in the first loop; computer program code means for determining a page from which the global breakpoint is to be removed, computer program code means for reading the page from an executable image into the physical memory if the page is not present in the physical memory, and computer program code means for removing the global breakpoint from the page present in the physical memory; and
  second computer program code means for performing by the computer program a second loop over the global breakpoint such that for each global breakpoint in the second loop; computer program code means for determining if a private copy exists for the page from which the global breakpoint is to be removed, computer program code means for determining the private copy if the private copy exists, computer program code means for reading the private copy into the physical memory if the private copy exists and is not preset in the physical memory, and computer program code means for removing the global breakpoint from the private copy present in the physical memory;
  wherein said computer program code means for reading includes turning off an operation set up earlier for inserting the global breakpoint in said page when said page is read into the physical memory.

38. The computer program product according to claim 37, wherein said computer program code means for reading includes computer program code means for providing a readpage process for reading said page into said physical memory and for removing the global breakpoint in said page immediately after being read into the physical memory.

39. The computer program product according to claim 37, wherein said readpage process is implemented as a kernel routine that is called when said page is loaded into said physical memory.

40. The computer program product according to claim 37, further including computer program code means for identifying said global breakpoint using an identifier of a file and an offset in said file.

41. The computer program product according to claim 40, wherein said file identifier is an inode.

42. The computer program product according to claim 40, further including computer program code moans for determining if said page is present in said physical memory using a lookup table based on said file identifier and said offset.

43. The method according to claim 1, wherein the second loop is performed after the first loop is performed.

44. The apparatus according to claim 9, further comprising means for performing the second loop after the first loop is performed.

45. The computer program product according to claim 17, further comprising computer program code means for performing the second loop after the first loop is performed.

46. The method according to claim 25, wherein the second loop is performed after the first loop is performed.

47. The apparatus according to claim 31, further comprising means for performing the second loop after the first loop is performed.

48. The computer program product according to claim 37, further comprising computer program code means for performing the second loop after the first loop is performed.

* * * * *

UNITED STATES PATENT AND TRADEMARK OFFICE
CERTIFICATE OF CORRECTION

PATENT NO. : 7,000,225 B2
DATED : February 14, 2006
INVENTOR(S) : Sangavarapu et al.

It is certified that error appears in the above-identified patent and that said Letters Patent is hereby corrected as shown below:

<u>Column 7,</u>
Line 3, delete "," and insert -- . --.

<u>Column 10,</u>
Line 53, add -- . -- at the end of the sentence.

<u>Column 11,</u>
Lines 47 and 55, delete ";" and insert -- : --.
Line 59, delete "able into physical" and insert -- able image into the physical --.

<u>Column 12,</u>
Lines 40 and 51, delete "executable" and insert -- executable image --.
Line 59, delete "-breakpoint" and insert -- breakpoints. --.
Line 59, delete "-has been added."

<u>Column 13,</u>
Line 31, delete "executable into" and insert -- executable image into --.
Line 38, delete "breakpoint" and insert -- breakpoints --.
Line 54, delete "-has been added".

<u>Column 14,</u>
Line 5, delete "coda" and insert -- code --.
Lines 31 and 39, delete ";" and insert -- : --.
Line 45, after "memory" insert -- wherein said reading step includes the step of turning off an operation set up earlier for inserting the global breakpoint in said page when said page is read into the physical memory. --.
Line 50, delete ":" and insert -- . --.
Delete lines 52-55.

<u>Column 15,</u>
Line 9, delete "a" and insert -- the --.
Lines 11, 20 and 57, delete ";" and insert -- : --.
Line 36, delete "break point" and insert -- break point --.
Line 56, delete "point" and insert -- points --.

UNITED STATES PATENT AND TRADEMARK OFFICE
CERTIFICATE OF CORRECTION

PATENT NO. : 7,000,225 B2
DATED : February 14, 2006
INVENTOR(S) : Sangavarapu et al.

It is certified that error appears in the above-identified patent and that said Letters Patent is hereby corrected as shown below:

Column 16,
Line 7, delete "breakpoint" and insert -- breakpoints --.
Line 8, delete ";" and insert -- : --.
Line 11, delete "determining" and insert -- detecting --.
Line 14, delete "preset" and insert -- present --.
Line 39, delete "moans"and insert -- means --.

Signed and Sealed this

Twenty-fifth Day of April, 2006

JON W. DUDAS
*Director of the United States Patent and Trademark Office*